United States Patent [19]
Thau et al.

[11] Patent Number: 6,104,552
[45] Date of Patent: Aug. 15, 2000

[54] VEHICULAR REARVIEW MIRROR ASSEMBLY WITH FORWARD VISION OPTICAL SYSTEM

[75] Inventors: Wolfgang Thau, Gevelsberg; Thomas Hempel, Steinheim; Herwig Polzer, Miltenberg, all of Germany

[73] Assignee: Donnelly Corporation, Holland, Mich.

[21] Appl. No.: 08/985,928

[22] Filed: Dec. 5, 1997

[30] Foreign Application Priority Data

Dec. 6, 1996 [DE] Germany ............... 296 21 172 U

[51] Int. Cl.[7] ............... G02B 17/00; G02B 5/04; G02B 5/08; B60R 1/06
[52] U.S. Cl. ............... 359/726; 359/831; 359/833; 359/837; 359/838; 359/871; 359/872; 359/503
[58] Field of Search ............... 359/402, 503, 359/726, 737, 831, 833, 834, 837, 838, 857, 861, 850, 871, 872

[56] References Cited

U.S. PATENT DOCUMENTS

| | | | |
|---|---|---|---|
| 1,883,296 | 10/1932 | Johnson . | |
| 2,622,482 | 12/1952 | Balkin | 88/93 |
| 2,757,575 | 8/1956 | Kovach | 359/834 |
| 2,796,003 | 6/1957 | Kaufman | 359/862 |

(List continued on next page.)

FOREIGN PATENT DOCUMENTS

| | | |
|---|---|---|
| 0687592 A1 | 12/1995 | European Pat. Off. . |
| 701260 | 3/1931 | France . |
| 743180 | 3/1933 | France . |
| 1398407 | 8/1965 | France . |
| 2182753 | 12/1973 | France . |
| 2641243 | 7/1990 | France . |
| 2676030 | 11/1992 | France . |
| 2352708 A1 | 4/1975 | Germany . |
| 2634372 A1 | 2/1978 | Germany . |
| 2824354 A1 | 12/1978 | Germany . |
| 2918822 A1 | 11/1980 | Germany . |
| 3635471 A1 | 4/1988 | Germany . |
| 3635473 A1 | 4/1988 | Germany . |

(List continued on next page.)

OTHER PUBLICATIONS

Translation of Japanese Abstract of Patent No. 03050044, published Mar. 4, 1991.
U.S. Patent Application Serial No. 08/687,628, filed Jul. 26, 1996, entitled Universal Exterior Vehicle Security Light, by inventors Todd W. Pastrick et al., commonly assigned to the owner of the present application.
U.S. Patent Application Serial No. 08/840,514, filed Apr. 21, 1997, entitled Illuminated Power Tilt Exterior Mirror for Vehicle, by inventors Desmond J. O'Farrell et al., commonly assigned to the owner of the present application.
U.S. Patent Application Serial No. 08/934,490, filed Sep. 19, 1997, entitled Exterior Vehicle Mirror System Including Signal Light, by inventors Todd W. Pastrick et al., commonly assigned to the owner of the present application.
U.S. Patent Application Serial No. 08/933,375, filed Sep. 19, 1997, entitled Exterior Vehicle Security Light, by inventor Todd W. Pastrick, commonly assigned to the owner of the present application.
German Search Report for Utility Model Application No. 296 21 172.9 (May 7, 1997).
Translation of Published Japanese Patent Abstract JP5–301539, Feb. 17, 1994. vol. 18, No. 98.

*Primary Examiner*—Ricky D. Shafer
*Attorney, Agent, or Firm*—Van Dyke, Gardner, Linn & Burkhart, LLP

[57] ABSTRACT

An exterior rearview mirror for vehicles incorporates a forward vision improving system allowing improved visibility of the opposite roadway forward of the vehicle for safer passing. Preferably, the forward vision system includes a pair of prisms mounted in a mirror housing, one of which is directed at an angle of incidence past and to the left of a front, slower vehicle, the other of which receives the image from the first, and is positioned in the driver's line of sight. In one embodiment of the vision system, the front prism of the pair of prisms is replaced by a divergent lens.

3 Claims, 5 Drawing Sheets

U.S. PATENT DOCUMENTS

| | | | |
|---|---|---|---|
| 3,659,929 | 5/1972 | Yuzawa . | |
| 3,809,461 | 5/1974 | Baumgardner et al. | 359/737 |
| 3,833,291 | 9/1974 | Samuelson | 95/11 |
| 4,274,078 | 6/1981 | Isobe et al. | 340/98 |
| 4,475,100 | 10/1984 | Duh | 340/98 |
| 4,646,210 | 2/1987 | Skogler et al. | 362/142 |
| 4,733,336 | 3/1988 | Skogler et al. | 362/142 |
| 4,807,096 | 2/1989 | Skogler et al. | 362/142 |
| 4,809,137 | 2/1989 | Yamada | 362/61 |
| 4,890,907 | 1/1990 | Vu et al. | 350/605 |
| 4,916,430 | 4/1990 | Vu et al. | 340/363 |
| 5,014,167 | 5/1991 | Roberts | 362/83.1 |
| 5,017,903 | 5/1991 | Krippelz, Sr. | 340/472 |
| 5,109,214 | 4/1992 | Heidman, Jr. | 340/475 |
| 5,178,448 | 1/1993 | Adams et al. | 362/83.1 |
| 5,207,492 | 5/1993 | Roberts | 362/30 |
| 5,264,962 | 11/1993 | Kho | 359/362 |
| 5,313,335 | 5/1994 | Gray et al. | 359/839 |
| 5,371,659 | 12/1994 | Pastrick et al. | 362/83.1 |
| 5,497,305 | 3/1996 | Pastrick et al. | 362/83.1 |
| 5,497,306 | 3/1996 | Pastrick | 362/83.1 |
| 5,594,593 | 1/1997 | Milner | 359/726 |
| 5,594,594 | 1/1997 | Ung | 359/838 |
| 5,617,245 | 4/1997 | Milner | 359/837 |
| 5,624,176 | 4/1997 | O'Farrell et al. | 362/83.1 |
| 5,669,698 | 9/1997 | Veldman et al. | 362/83.1 |
| 5,669,699 | 9/1997 | Pastrick et al. | 362/83.1 |
| 5,669,704 | 9/1997 | Pastrick | 362/83.1 |
| 5,669,705 | 9/1997 | Pastrick et al. | 362/83.1 |

FOREIGN PATENT DOCUMENTS

| | | | |
|---|---|---|---|
| 3803510 | 9/1988 | Germany . | |
| 3807549 A1 | 11/1988 | Germany . | |
| 9201038 | 5/1992 | Germany . | |
| 29508198 U | 8/1995 | Germany . | |
| 535474 | 5/1955 | Italy | 359/857 |
| 504651 | 3/1957 | Italy | 359/402 |
| 61-188242 | of 1986 | Japan . | |
| 62-218248 | 9/1987 | Japan . | |
| 405104998 | 4/1993 | Japan | 359/507 |
| 5-301539 | 11/1993 | Japan | 359/850 |
| 405330383 | 12/1993 | Japan | 359/833 |

VEHICULAR REARVIEW MIRROR ASSEMBLY WITH FORWARD VISION OPTICAL SYSTEM

FIELD OF THE INVENTION

This invention relates to an exterior rearview mirror for vehicles having a mirror housing incorporating a forward vision improving system allowing improved visibility of the opposite roadway forward of the vehicle.

BACKGROUND OF THE INVENTION

The passing and overtaking of vehicles which are driving slowly, especially on two-lane roads, creates safety hazards due to sudden, emerging, oncoming traffic. When passing is desired, and the slower vehicle ahead is large or wide, as for example trucks and buses, it is difficult for the faster, following vehicle to be aware of oncoming traffic which would prevent passing. In order to allow safe passing by overtaking vehicles, the passing vehicle must pull out far to the left before beginning to pass so that the driver can decide whether or not it is safe to pass. Providing improved vision around large vehicles such as trucks or buses without requiring dangerous movement into the opposite lane to determine whether passing can take place is a highly desirable result for improved safety.

One attempted solution to this problem is shown in German Offenlegungschrift DE 29 18 822 which discloses an exterior rearview mirror for vehicles by which the oncoming traffic is made visible for the driver by a deviation mirror. The arrangement of a number of mirrors within an exterior rearview housing results in a bulky mirror housing which as a part projecting laterally from the vehicle creates a risk of damage in parking lots or similar narrow lanes.

Another attempted solution is shown in German Offenlegungschrift DE 23 52708 which discloses an optical system for vehicles which includes an arrangement of prisms for displaying oncoming traffic. However, the field of view for the driver offered by the prisms is too small for his determining safely the traffic situation ahead of the vehicle.

SUMMARY OF THE INVENTION

The present invention provides a system incorporated in an exterior vehicle mirror which improves the visibility of the opposite roadway and lane ahead of the vehicle to allow safer passing.

According to one form of the invention, an optical system is included in the forward side of the exterior mirror housing. One portion of the system which receives images from the forward direction points in the direction of motion. The system is connected with a reproducing mechanism placed in the angular field of the driver. Accordingly, the driver can see the opposite roadway in front of him from a considerable distance without having to move his or her vehicle significantly into the opposite traffic lane.

The optical system may include an array of lenses, prisms or mirrors, or an electronic camera to which a monitor is connected within the vehicle as a reproducing or display system.

In a preferred embodiment of the invention, the optical system includes at least one lens arranged ahead a prism which allows improved visibility of the oncoming traffic in a field of display which is clearly visible to the driver. Preferably, the optical system includes in a series connection a divergent lens and a reflection prism, specifically a prism according to "Bauernfeind." Such prism allows reproducing a laterally proper picture for which only a small space is necessary. Such advantage is a result of utilizing a cathetus of the prism as a transparent surface for the incoming optical beams which are subjected to a total or internal reflection at the hypotenuse of the prism. A mirror plate preferably is placed directly upon one side surface of the prism, specifically the other cathetus of the prism. On the other hand, if the mirror is spaced from the side surface of the prism, the angular position of the light beams emerging from the prism may be adjusted. The lens may have a focal distance of between −100 and −130 mm and/or a diopter between −10 and −8. Good results as to the visibility of the displayed image are obtained by selecting the angle of the prism to 60° and to metal coat only one half of the hypotenuse for improving reflection of the light beam.

The optical system preferably is sealingly enclosed within a special casing in order to prevent the entry of dust and dirt. The interior of the casing may be filled with dried air or any protective gas in order to avoid condensation of humidity in case of low outside temperatures. Preferably, the optical system may be mounted to the mirror housing in such an orientation that the total angle of deflection of the light beams outgoing from the optical system with respect to the ingoing light beams is about 45°.

These and other objects, advantages, purposes and features of the invention will become more apparent from a study of the following description taken in conjunction with the drawings.

DESCRIPTION OF THE PREFERRED EMBODIMENTS

Figures 1, 2, 3:
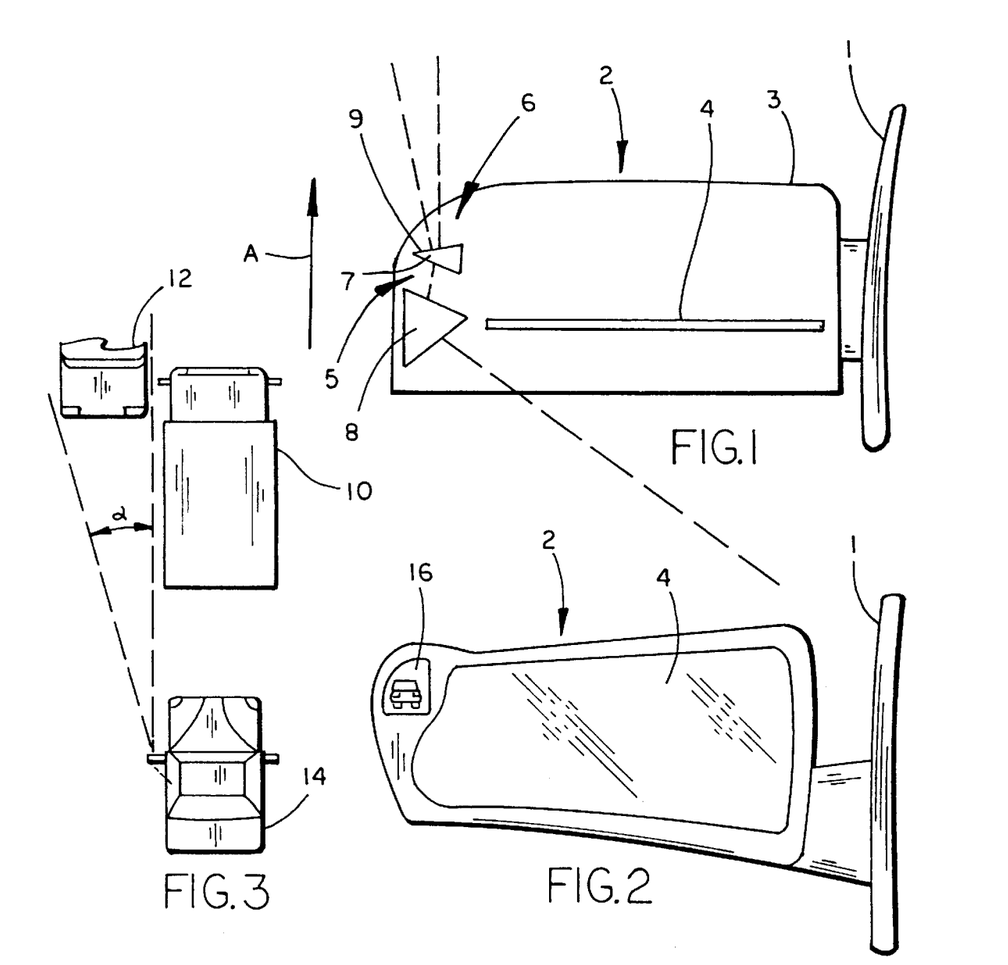
FIG. 1 is a plan view of a first embodiment of the exterior vehicle mirror of the present invention incorporating an optical system for viewing oncoming traffic.
FIG. 2 is an elevation of the rear or viewing side of the exterior rearview mirror shown in FIG. 1.
FIG. 3 is a schematic illustration of a vehicle incorporating the optical system of the present invention viewing oncoming traffic to the side of and adjacent a slower vehicle being overtaken.

Referring now to the drawings in greater detail, FIG. 1 illustrates a first embodiment 2 of the exterior rearview mirror of the present invention mounted on the left side of a vehicle body 1 and including a mirror housing 3 and a rearview mirror element 4 mounted in the mirror housing. The direction of motion is shown by the arrow A in FIG. 1.

An optical system 6 is built in the forward part 5 of mirror housing 3. System 6 includes a pair of prisms 7, 8. The receiving area or side 9 of front prism 7 points in the direction of motion and has an angle of incidence alpha ($\alpha$) to the direction of motion which is indicated in FIG. 3. The angle of incidence alpha ($\alpha$) includes a visual range which reaches past and to the left of a front, slower vehicle 10 in the direction of motion, and encompasses a possible oncoming vehicle 12. In contrast, with a conventional exterior mirror, the oncoming vehicle will only be visible to the driver of the following car 14 at a position farther to the left in the lane of the oncoming traffic.

FIG. 2 illustrates exterior rearview mirror 2 with mirror element 4 facing backward or to the rear, whereby a field of view 16 is created by the optical reproducing system in the forward part of housing 3. For the driver, oncoming vehicle 12 is reduced in size in the field of view 16 of the optical system. However, it is still clearly visible.

If the optical system is composed of an electronic camera, a monitor electrically connected to it can be placed inside the car 14 behind the windshield, whose field of view lies considerably closer to the driver's line of sight.

The present optical system reduces the risk and increases safety when passing a slower vehicle due to a greater forward field of view without the vehicle having to leave the driving lane. Additionally, installations for the adjustment, glare reduction, heating/defrosting and keeping the optical system free from dirt can be integrated into the exterior rearview mirror according to the invention.

Figure 4:
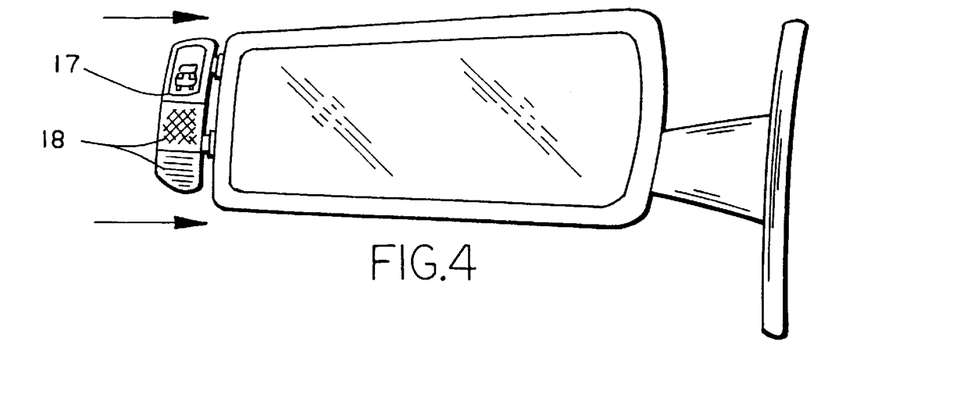
FIG. 4 is an elevation of a second embodiment of the exterior rearview mirror of the present invention incorporating an optical system for viewing oncoming traffic as well as a lighting system.

As shown in FIG. 4, the optical system of the present invention 17 can be mounted to the outer end of the exterior rearview mirror housing in a separate module which can also encompass other functions such as lighting units 18 or the like.

It should be noted that the prisms 7, 8 of the present invention may also be Fresnel type lenses as well as fiber optic systems.

Figure 7:
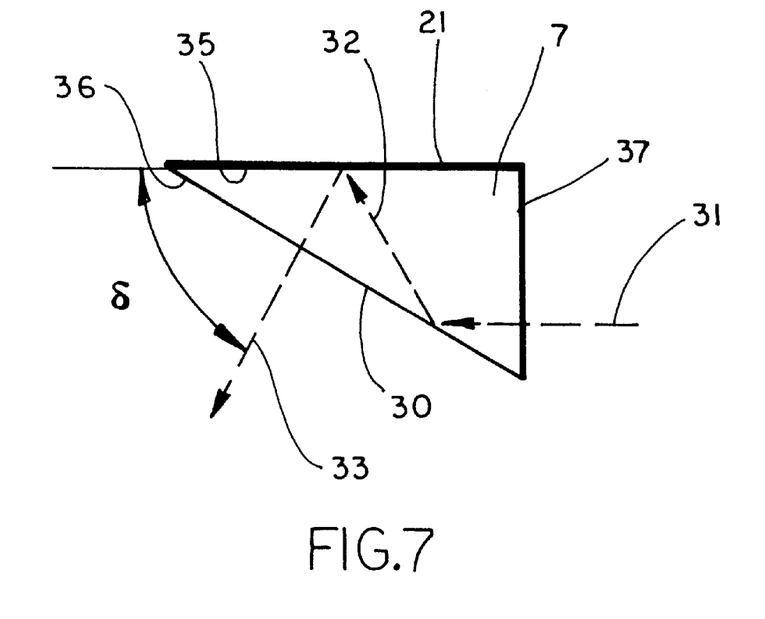
FIG. 7 is a schematic representation of a reflection prism.

The embodiment of the invention according to FIG. 7 comprises a right triangular prism 7 which is a reflection prism according to Bauernfeind. Such a prism 7 produces a laterally proper beam deflection within a minimum of space. This is due to a utilization of the hypotenuse 30 of the prism partially as a transparent surface 36 for the passing of light beams and to the remaining part as a kind of mirror subjecting the light beam to total reflection. The path of the light beams 31, 32, 33 when passing through the prism 7 is indicated in FIG. 7 by arrows. It may be seen that the light beam 31 undergoes total reflection within the prism 7 at one part of the hypotenuse 30. The totally reflected light beam 32 impinges on cathetus 35 which is provided with a reflecting metal coating 21, for being reflected thereon as light beam 33 which emerges from the prism 7. As may also be seen from FIG. 7, input light beam 31 penetrates prism 7 transversely to the short cathetus 37, and outgoing light beam 31 leaves prism 7 transversely to the hypotenuse 30 at the other part 36 thereof It will be understood that the image, after passing through and being reflected twice within prism 7, as well as the other prisms in the optical systems described below, is visible in the same orientation as if the driver had viewed the field of view directly with his unaided eyes. Thus, the image visible through the present invention is not distorted or reversed as is produced by other prior known forward viewing systems.

Figure 8:
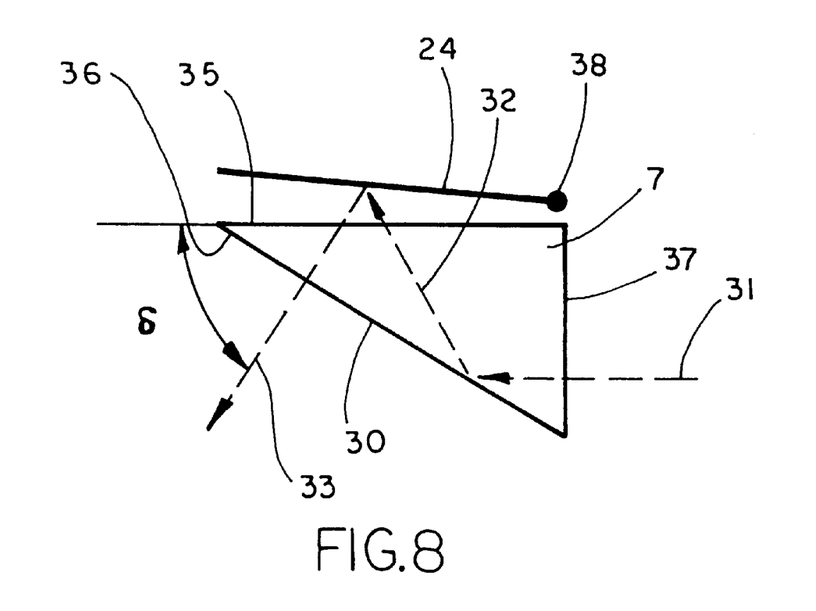
FIG. 8 is another embodiment of a prism having an adjustable mirror plate means.

According to a further embodiment of the invention shown in FIG. 8, the reflective coating 21 is replaced by a flat reflective mirror plate 24 mounted to a pivot 38 and may be spaced from cathetus 35 or extend along cathetus 35. By modifying the angular position of mirror plate 24 with respect to prism 7 the angle $\delta$ of the output light beam 33 with respect to the long cathetus 35 of prism 7 may vary whereas the input light beam 31 remains unchanged.

Figure 12:
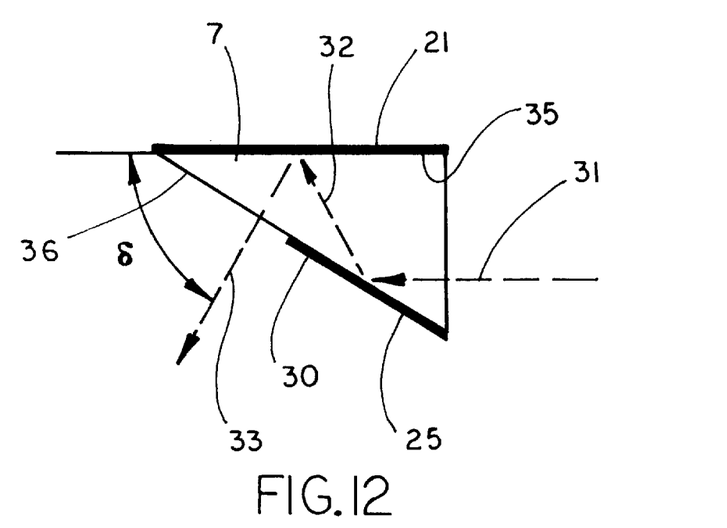
FIG. 12 is a representation of the partially metal coated prism.

According to yet another embodiment of the invention (FIG. 12) the reflection of light beam 31 at the hyptotenuse 30 can be improved by providing a metal coating 25 upon a portion of the hypotenuse 30 such that the emerging light beam 33 may leave the prism 7 unimpaired by the coating 25 through an uncoated portion 36 of the hypotenuse 30.

Figure 9:
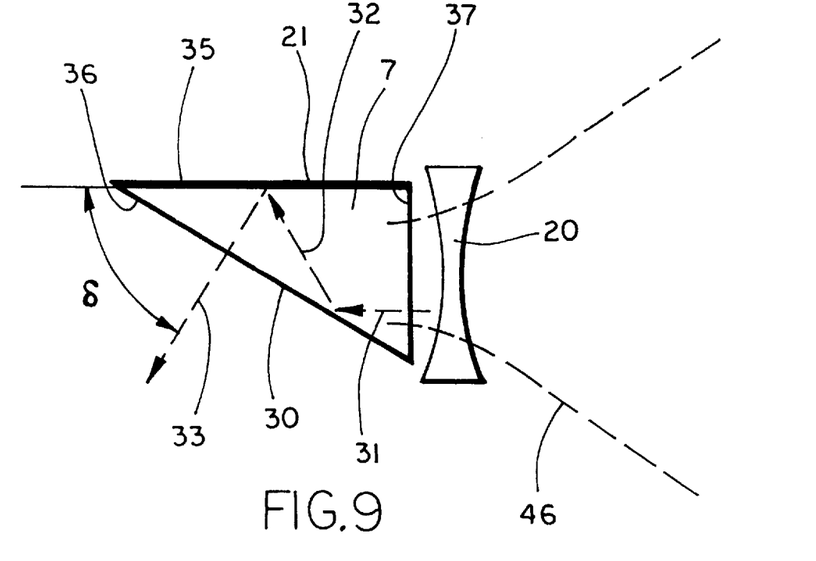
FIG. 9 is a schematic representation of a prism with a divergent lens.

In order to produce an easily visible, correctly oriented representation of the oncoming traffic within the filed of view 16, the invention provides for a divergent lens 20 mounted ahead of the cathetus 37 of the prism (FIG. 9). The biconcave divergent lens 20 may have a focal distance between −100 mm and −130 mm or may have diopters between −10 and −8. The angle of the prism 7 may be selected to 60°. The incoming light 46 passes through the divergent lens 20 and enters the prism 7 vertically through the short cathetus 37, is thereafter totally reflected at the hypotenuse 30 within prism 7 optionally with the assistance of the coating 25, and is thereafter reflected at the metal coating 21 of the long cathetus 35 of prism 7. The reflected light emerges from the prism 7 through the transparent section 36 of hypotenuse 30. The image of the field of view is oriented in the same position, i.e., left to left and right to right, as if the driver had viewed the field of view with the unaided eye.

Figure 11:
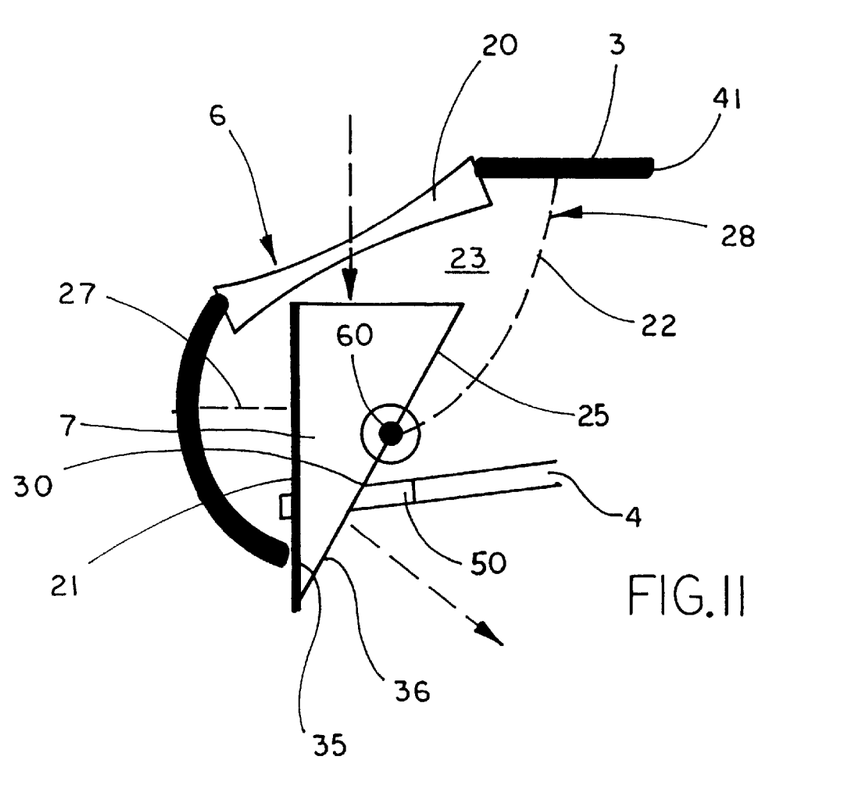
FIG. 11 is an arrangement of the divergent lens in the wall of the mirror housing.

FIG. 11 shows how the combination of the divergent lens 20 and prism 7 are built into the mirror housing 3 as a separate casing 28. Lens 20 is sealingly accommodated within an opening 6 in the forward outer end wall 41 of mirror housing 3, and prism 7 is mounted within the mirror housing behind the lens 20 such that the direction of the long cathetus 35 includes an angle with the (not shown) center line of lens 20. The casing 28 is formed with sealing walls 22 and 27 tightened to the wall of the mirror housing 3. Wall 22 of casing 28 is sealed at the hypotenuse 30, specifically at the metal coating 25 thereof, thereby forming a normally vertical line 60 of separation of the invisible part of the prism 7 from the transparent surface section 36 of the hypotenuse which forms the field of view 16 for the driver. For avoiding interferences with the rearview mirror element 4 the latter is provided with an outcut 50 which allows the prism 7 to extend partially rearwardly beyond rearview mirror element 4. The casing 28 forms a space 23 between the lens 20 and prism 7 from which humidity should be withdrawn in order to avoid condensation of water upon the optical surafces of the lens 20 and prism 7. So casing 28 may be filled with dried air or any convenient protective gas, e.g. $SF_6$.

Figure 10:
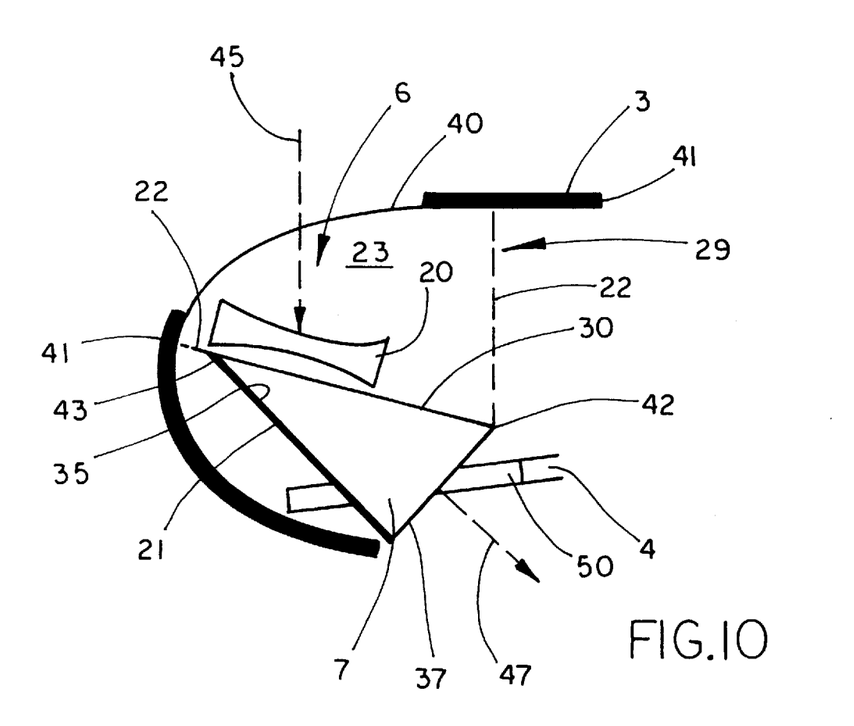
FIG. 10 is an arrangement of the prism and divergent lens within the mirror housing.

FIG. 10 shows another embodiment of the invention according to which the divergent lens 20 and prism 7 are differently arranged within a separate casing 29. The casing 29 has a transparent portion 40 of wall section 41 of the mirror housing 3 through which light may penetrate casing 29 and impinge on divergent lens 20. Lens 20 is mounted aside the hypotenuse 30 close to the edge 43 formed by hypotenuse and long cathetus 35 of prism 7. The light impinging on lens 20 is indicated by arrow 45 and leaves the prism 7 through short cathetus 37 in a direction as indicated by arrow 47. As compared to the embodiment of the invention according to FIG. 11, the path of the light through prism 7 follows the opposite direction because it is first reflected by mirror coating 21 provided on the long cathetus 35 and is thereafter again reflected internally at a portion of the hypotenuse 30 not covered by lens 20.

The last mentioned embodiment of the invention eases sealing of casing 29 at the prism 7 because wall 22 of casing 29 may be sealingly bond to edge 42 of prism 7 formed by hypotenuse 30 and short cathetus 37. Moreover, the last mentioned embodiment of the invention is advantageous therein that lens 20 is covered by the transparent section 40 and, therefore, the optical surfaces thereof are protected against dust and dirt. The field of view 16 for the driver is formed by the short cathetus 37.

Figure 5:
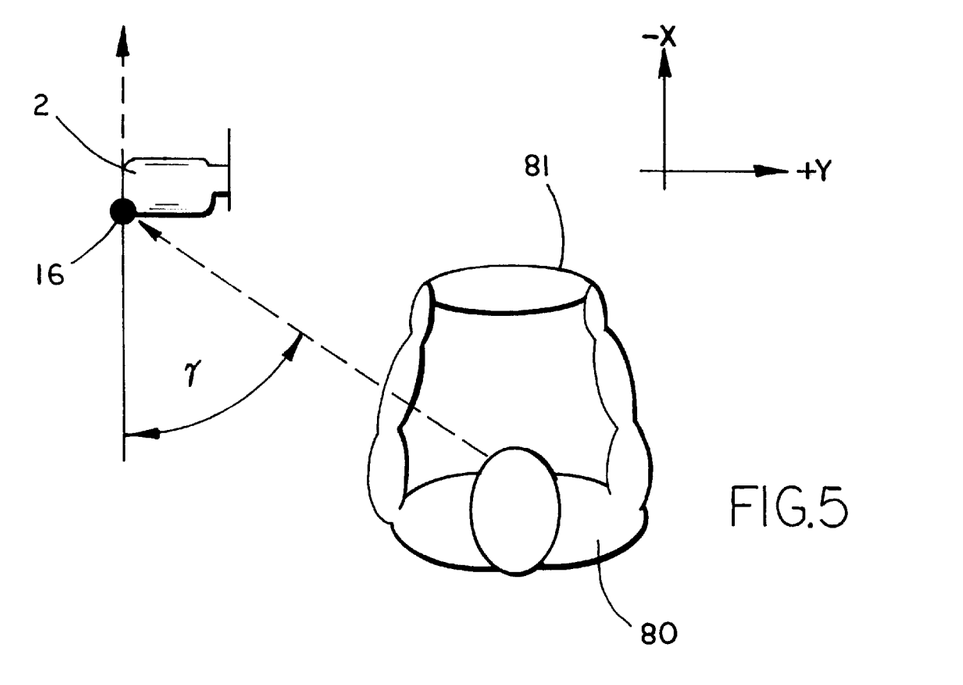
FIGS. 5 and 6 are schematic illustrations for explaining horizontal and vertical viewing angles γ and β, respectively for the driver of a vehicle.
Figure 6:
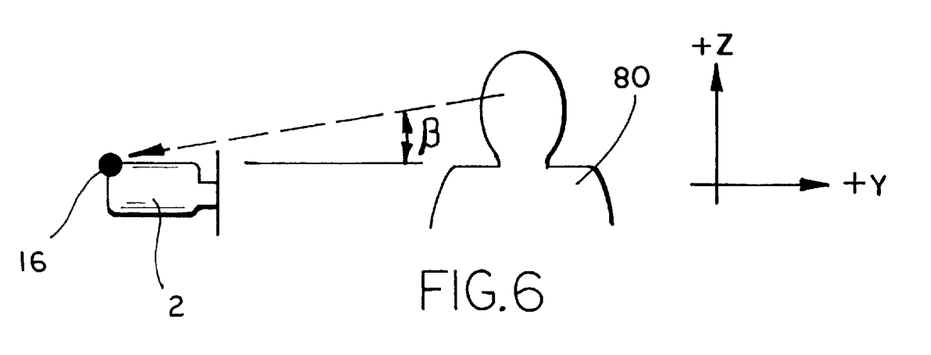

When utilizing the mirror assembly according to the invention by the driver he will adjust the mirror housing such that he can best inspect the field of view. Such adjustment may be made by activating an electric motor which is commonly provided for electrically adjusting the position of the mirror housing with respect to the car body. For exterior rearview mirror assemblies, the position of which is to be adjusted manually, it is recommended that the horizonal viewing angle γ and the vertical viewing angle β of the driver are selected according to the table given hereinafter. Of course, the driver should first assume a convenient sitting position behind the steering-wheel of the vehicle. The horizontal viewing angle γ and the vertical viewing angle β are defined in FIGS. 5 and 6 showing a driver 80 behind the steering-wheel 81 and directing his eyes toward the field of view 16 at the other end of mirror housing 2. The horizontal viewing angle γ is taken with respect to the direction of motion of the vehicle whereas the vertical viewing angle β is taken with respect to a horizontal plane.

|  | γ | β |
| --- | --- | --- |
| very small driver | ca.53° | ca.5° |
| small driver | ca.48° | ca.5° |
| normal driver | ca.42° | ca.14° |
| tall driver | ca.39° | ca.14° |

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are as follows:

1. An exterior rearview mirror assembly for a vehicle, the vehicle having a direction of forward motion and adapted to be operated by a driver, comprising:

a housing including a mirror element for viewing rearwardly of the vehicle;

a mount for supporting the housing on a vehicle; and an optical system for viewing in the direction of forward motion of the vehicle on which said assembly is mounted, said optical system including a pair of viewing optical elements, a first optical element of said pair of viewing optical elements having a side facing the direction of forward motion of the vehicle and positioned to provide a field of view therethrough forward of the vehicle which extends in the direction of forward motion of the vehicle, said field of view providing an image, and a second optical element of said pair of viewing optical elements being positioned rearwardly of said first optical element with respect to the direction of forward motion of the vehicle on which said assembly is mounted and receiving said image of said field of view, said second optical element having a side visible to the driver of the vehicle on which said assembly is mounted and providing said image to the driver said image provided to the driver being at a position which is adjacent to said mirror element; both of said optical elements being prisms.

2. The mirror assembly of claim 1 wherein said housing has a first end closest to the vehicle and a second end farthest from the vehicle; the second prism having a side extending at an acute angle to the direction of motion of the vehicle on which said assembly is mounted, said prisms being mounted adjacent said second end of said housing.

3. An exterior rearview mirror assembly for a vehicle, the vehicle having a direction of forward motion and adapted to be operated by a driver, comprising:

a housing including a mirror element;

a mount for supporting the housing on a vehicle; and an optical system for viewing in the direction of forward motion of the vehicle on which said assembly is mounted, said optical system including a pair of viewing optical elements, a first optical element of said pair of viewing optical elements having a side facing the direction of forward motion of the vehicle and positioned to provide a field of view therethrough which extends in the direction of forward motion of the vehicle, said field of view providing an image, and a second optical element of said pair of viewing optical elements being positioned rearwardly of said first optical element with respect to the direction of forward motion of the vehicle on which said assembly is mounted and receiving said image of said field of view, said second optical element having a side visible to the driver of the vehicle on which said assembly is mounted and providing said image to the driver at a position which is adjacent to said mirror element; both of said optical elements being prisms;

said housing having a first end closest to the vehicle and a second end farthest from the vehicle; said prisms being spaced from one another and mounted adjacent said second end of said housing; each prism having a side facing the other prism, said facing sides being generally parallel to one another.

* * * * *

UNITED STATES PATENT AND TRADEMARK OFFICE
CERTIFICATE OF CORRECTION

PATENT NO. : 6,104,552
DATED : August 15, 2000
INVENTOR(S) : Wolfgang Thau, Thomas Hempel and Herwig Polzer It is certified that error appears in the above-identified patent and that said Letters Patent is hereby corrected as shown below:

Column 2, line 34:
    After "traffic" delete "," and insert --;--
Column 3, line 58:
    Insert --.-- after "thereof"
Column 6, line 15:
    After "driver" insert --,--

Signed and Sealed this

First Day of May, 2001

Attest:

NICHOLAS P. GODICI

*Attesting Officer*    *Acting Director of the United States Patent and Trademark Office*